(12) United States Patent
Morita

(10) Patent No.: US 9,486,888 B2
(45) Date of Patent: Nov. 8, 2016

(54) CONTROLLER HAVING FUNCTION FOR DISPLAYING MOTOR LOAD

(71) Applicant: FANUC Corporation, Yamanashi (JP)

(72) Inventor: Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 14/470,360

(22) Filed: Aug. 27, 2014

(65) Prior Publication Data

US 2015/0066213 A1 Mar. 5, 2015

(30) Foreign Application Priority Data

Aug. 28, 2013 (JP) ................................. 2013-177047

(51) Int. Cl.
| | | |
|---|---|---|
| *B23Q 5/12* | (2006.01) | |
| *F16H 61/02* | (2006.01) | |
| *G01L 3/24* | (2006.01) | |
| *G01D 7/02* | (2006.01) | |
| *B23Q 5/10* | (2006.01) | |

(52) U.S. Cl.
CPC ............. *B23Q 5/12* (2013.01); *F16H 61/0204* (2013.01); *G01L 3/24* (2013.01); *B23Q 5/10* (2013.01); *G01D 7/02* (2013.01)

(58) Field of Classification Search
CPC .................................................. B23Q 5/12
USPC ....................................................... 700/275
See application file for complete search history.

(56) References Cited

U.S. PATENT DOCUMENTS

| | | | | |
|---|---|---|---|---|
| 5,844,344 A | * | 12/1998 | Uetake | ................... H02K 21/14 310/156.49 |
| 2008/0116833 A1 | | 5/2008 | Iwashita et al. | |
| 2012/0109360 A1 | | 5/2012 | Nishimura et al. | |
| 2012/0306413 A1 | | 12/2012 | Tezuka et al. | |

FOREIGN PATENT DOCUMENTS

| | | |
|---|---|---|
| CN | 101201259 A | 6/2008 |
| CN | 202166865 U | 3/2012 |
| CN | 102528556 A | 7/2012 |
| CN | 102811019 A | 12/2012 |
| JP | S58-120455 A | 7/1983 |
| JP | 61-274847 A | 12/1986 |
| JP | H10-090011 A | 4/1998 |
| JP | 2014-018911 A | 2/2014 |

* cited by examiner

*Primary Examiner* — Tejal Gami
(74) *Attorney, Agent, or Firm* — Hauptman Ham, LLP

(57) ABSTRACT

A low-cost controller having a function for effectively displaying information of present motor output regarding the maximum output and the continuous rating output of the motor. The controller includes first and second storing parts which store first and second data, representing a relationship between a rotation frequency and a maximum output of the motor, and a relationship between the rotation frequency and a continuous rating output of the motor, respectively; first and second ratio calculating parts which calculate first and second ratios, corresponding to a ratio of one of the maximum output and the continuous rating output to the other at a present rotation frequency, and a ratio of a present actual output of the motor to the one of the maximum output and the continuous rating output at the present rotation frequency, respectively; and a displaying part which displays the first and second ratios on the same screen.

4 Claims, 6 Drawing Sheets

CONTROLLER HAVING FUNCTION FOR DISPLAYING MOTOR LOAD

RELATED APPLICATIONS

The present application claims priority to Japanese Application Number 2013-177047, filed Aug. 28, 2013, the disclosure of which is hereby incorporated by reference herein in its entirety.

BACKGROUND OF THE INVENTION

1. Field of the Invention

The present invention relates to a controller for controlling a motor which drives a spindle of a machine tool, the controller having a function for displaying motor load.

2. Description of the Related Art

In a machine tool having a spindle driven by a motor, a device for displaying motor load (or a load meter) is generally used, in order to judge or estimate whether processing under a certain processing condition such as a cutting condition can be carried out. For example, JP S58-120455 A discloses a device for displaying a ratio of a spindle load relative to a rated load, wherein the ratio is indicated in green when the ratio is not more than 100%, and the ratio is indicated in red when the ratio exceeds 100%.

JP H10-090011 A discloses a method for displaying a coordinate system including horizontal and vertical axes representing a rotation frequency and an output of a motor, respectively, wherein a marker for indicating present rotation frequency and output of the motor is displayed along with a curve indicating output characteristics of the motor.

There are two types of load meters as described above. One type is a load meter with reference to a maximum output (hereinafter, such a load meter is referred to as a maximum output-referenced load meter), which calculates and displays a ratio of a present motor output (or a motor output during processing) relative to a reference value, the reference value corresponding to the maximum output. In the maximum output-referenced load meter, "100%" means a load level, wherein the motor is stopped due to torque shortage when the motor is subject to load more than the load level. Therefore, it is easy for an operator to determine as to how much margin is left between the present output and the load level.

The other type is a load meter with reference to a continuous rating output (hereinafter, such a load meter is referred to as a continuous rating output-referenced load meter), which calculates and displays a ratio of a present motor output (or a motor output during processing) relative to a reference value, the reference value corresponding to the continuous rating output. In the continuous rating output-referenced load meter, "100%" means a load level, wherein the motor or an amplifier thereof is overheated when the motor is continuously operated while being subject to load more than the load level. Therefore, it is easy for an operator to determine as to how much margin is left between the present output and the load level.

In this regard, as exemplified in FIG. 8, when a base velocity (where the motor velocity transits from a constant torque region to a constant output region) of a maximum output characteristic (Vb) and a base velocity of a continuous rating output characteristic (Vb) coincide with each other, a ratio between values indicated by the above two types of load meters is constant at any motor velocity (or rotation frequency). Therefore, when the value of one of the load meters is given, the value of the other load meter can be determined by a simple conversion.

On the other hand, as exemplified in FIG. 9, when the base velocity of the maximum output characteristic ($Vb_1$) and the base velocity of the continuous rating output characteristic ($Vb_2$) are different, a ratio between values indicated by the above two types of load meters is varied depending on the motor velocity (or rotation frequency). Therefore, it is not easy to covert one load meter value to the other load meter value. In other words, in a motor as shown in FIG. 9, it is necessary to take into consideration the present motor velocity (or the motor velocity during processing) in order to convert one load meter value to the other load meter value, and thus it is difficult to simultaneously determine both of the load meter values.

In a motor having a characteristic as shown in FIG. 8, the continuous rating output can be determined by multiplying a maximum output value by a constant ratio. Therefore, an operator can easily know as to how much margin is left between the present motor output and the maximum output and between the present output and the continuous rating output. However, in a motor having a characteristic as shown in FIG. 9, even when the load meter value with reference to the maximum output is given, an operator cannot easily know as to whether the motor can be continuously operated at the present load (or how much margin is left between the motor output and the continuous rating output).

In the device of JP S58-120455 A, a load state of a motor can be color-coded according to load values. However, this document does not provide means to solve the above problem. Further, in order to realize a display method of JP H10-090011 A in a motor controller, it is necessary to use a graphic display for indicating a graph. Therefore, the method of JP H10-090011 A is disadvantageous in view of a graphic resource, a memory resource and a cost of the controller.

SUMMARY OF THE INVENTION

An object of the present invention is to provide a low-cost controller having a function for effectively displaying information of present motor output regarding the maximum output and the continuous rating output of the motor, even when the base velocities of the maximum output characteristic and the continuous rating output characteristic are different.

According to the present invention, a controller for controlling a motor which drives a spindle of a machine tool is provided, the controller comprising: a first storing part which stores first data representing a relationship between a rotation frequency of the motor and a maximum output of the motor; a second storing part which stores second data representing a relationship between the rotation frequency of the motor and a continuous rating output of the motor; a first ratio calculating part which calculates a first ratio corresponding to a ratio of one of the maximum output and the continuous rating output to the other at a present rotation frequency of the motor; a second ratio calculating part which calculates a second ratio corresponding to a ratio of a present actual output of the motor to the one of the maximum output and the continuous rating output of the motor at the present rotation frequency of the motor; and a displaying part which displays the first ratio and the second ratio on the same screen.

In a preferred embodiment, the displaying part displays the first ratio and the second ratio as mathematical values on the same screen.

In a preferred embodiment, the displaying part displays the first ratio and the second ratio as bar graphs on the same screen.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
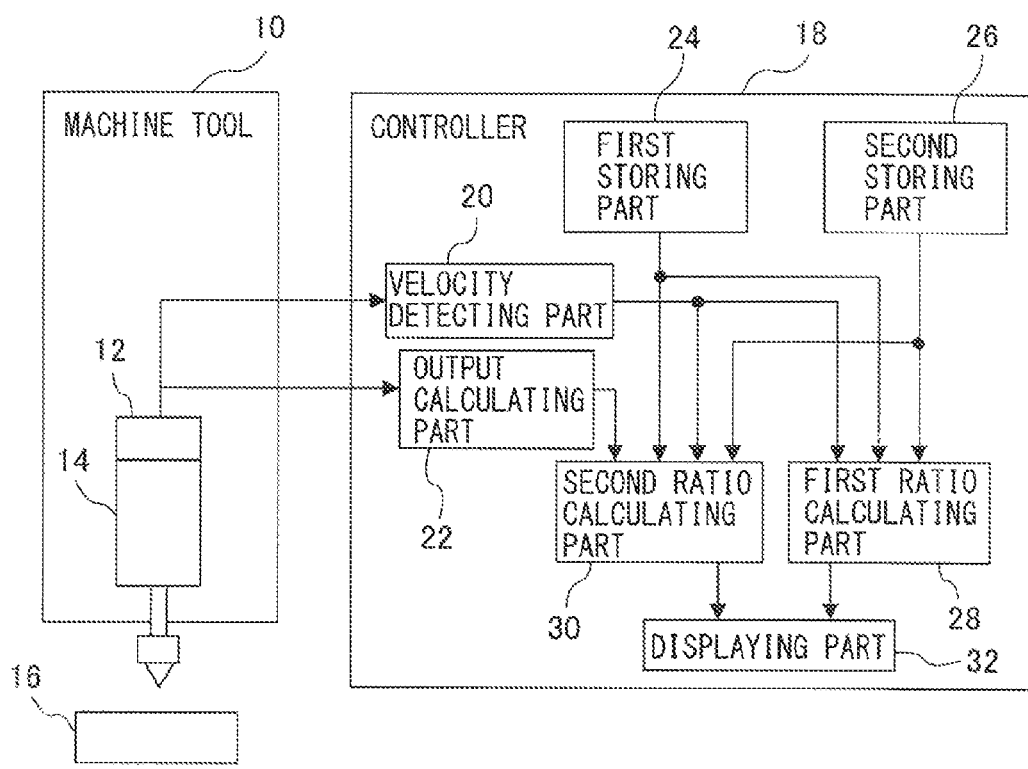
FIG. 1 is a functional block diagram of a controller according to a preferred embodiment of the present invention.

FIG. 1 shows a functional block diagram of a controller according to a preferred embodiment of the present invention, along with a schematic configuration of a machine tool having a motor (or an electric motor) controlled by the controller. Machine tool 10 has a spindle 14 driven by a schematically shown motor 12, so that machine tool 10 can carry out processing such as cutting in relation to workpiece 16. Motor 12 is controlled by a controller 18. Controller 18 has a velocity detecting part 20 which detects a rotation frequency (or a number of rotations) of motor 12, and an output calculating part 22 which calculates an output of motor 12, wherein controller 18 controls motor 12 based on the present (for example, at the time of operation) rotation frequency and the present actual output, etc. In this regard, an encoder for detecting the rotating velocity (or the rotation frequency) of motor 12 may be used as velocity detecting part 20. However, a detection value detected by velocity detecting part 20 or a velocity command value for controlling motor 12 output by controller 18 may be used as the rotating velocity of the motor used in the procedure as described below.

Further, controller 18 has a first storing part 24 which stores first data representing a relationship between the rotation frequency of motor 12 and the maximum output of motor 12; a second storing part 26 which stores second data representing a relationship between the rotation frequency of motor 12 and the continuous rating output of motor 12; a first ratio calculating part 28 which calculates a first ratio corresponding to a ratio of one of the maximum output and the continuous rating output to the other at a present rotation frequency of motor 12; a second ratio calculating part 30 which calculates a second ratio corresponding to a ratio of the one of the maximum output and the continuous rating output to a present actual output of motor 12 at the present rotation frequency of motor 12; and a displaying part 32 which displays the first ratio and the second ratio on the same screen. Hereinafter, the procedure in controller 18 and functions of the components of controller 18 are explained.

Figure 8:
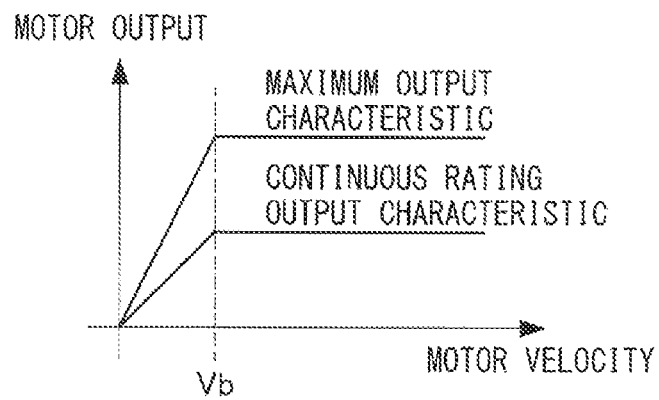
FIG. 8 is a graph showing an example wherein base velocities of a maximum output characteristic and a continuous rating output characteristic of a motor coincide with each other.
Figure 9:
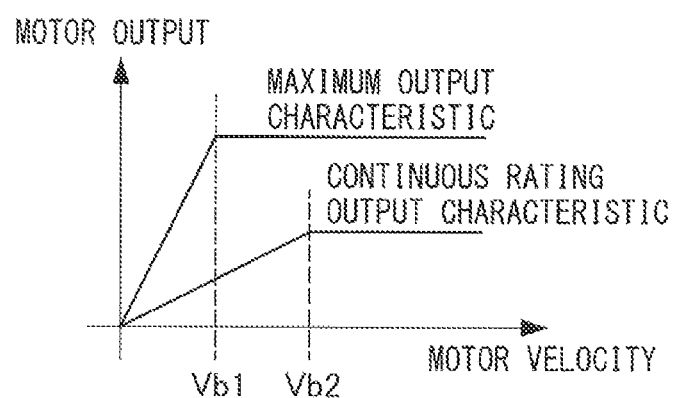
FIG. 9 is a graph showing an example wherein base velocities of a maximum output characteristic and a continuous rating output characteristic of a motor are different from each other.

Previously, means for obtaining the maximum output and the continuous rating output in relation to the motor velocity is provided. Concretely, the first data, which represents the maximum output characteristic of motor 12 as shown in FIGS. 8 and 9, is stored in first storing part 24. In this regard, the maximum output value may be determined by reading it from a table representing the relationship between the velocity and the maximum output value of motor 12. Otherwise, when motor 12 is a synchronous motor, the maximum output value may be determined by multiplying a maximum allowable current value at a motor velocity by a torque constant and a motor velocity value. On the other hand, when motor 12 is an induction motor, the maximum output value may be determined by multiplying a maximum allowable excitation current value at a motor velocity by a maximum allowable torque current value and a motor velocity value. The relationship between the motor velocity and the maximum output obtained as such is stored in first storing part 24 as the first data.

Similarly, the second data, which represents the continuous rating output characteristic of motor 12 as shown in FIGS. 8 and 9, is previously stored in second storing part 26. In this regard, the continuous rating output value may be determined by reading it from a table representing the relationship between the velocity and the continuous rating output value of motor 12. The relationship between the motor velocity and the continuous rating output obtained as such is stored in second storing part 26 as the second data.

Figure 2:
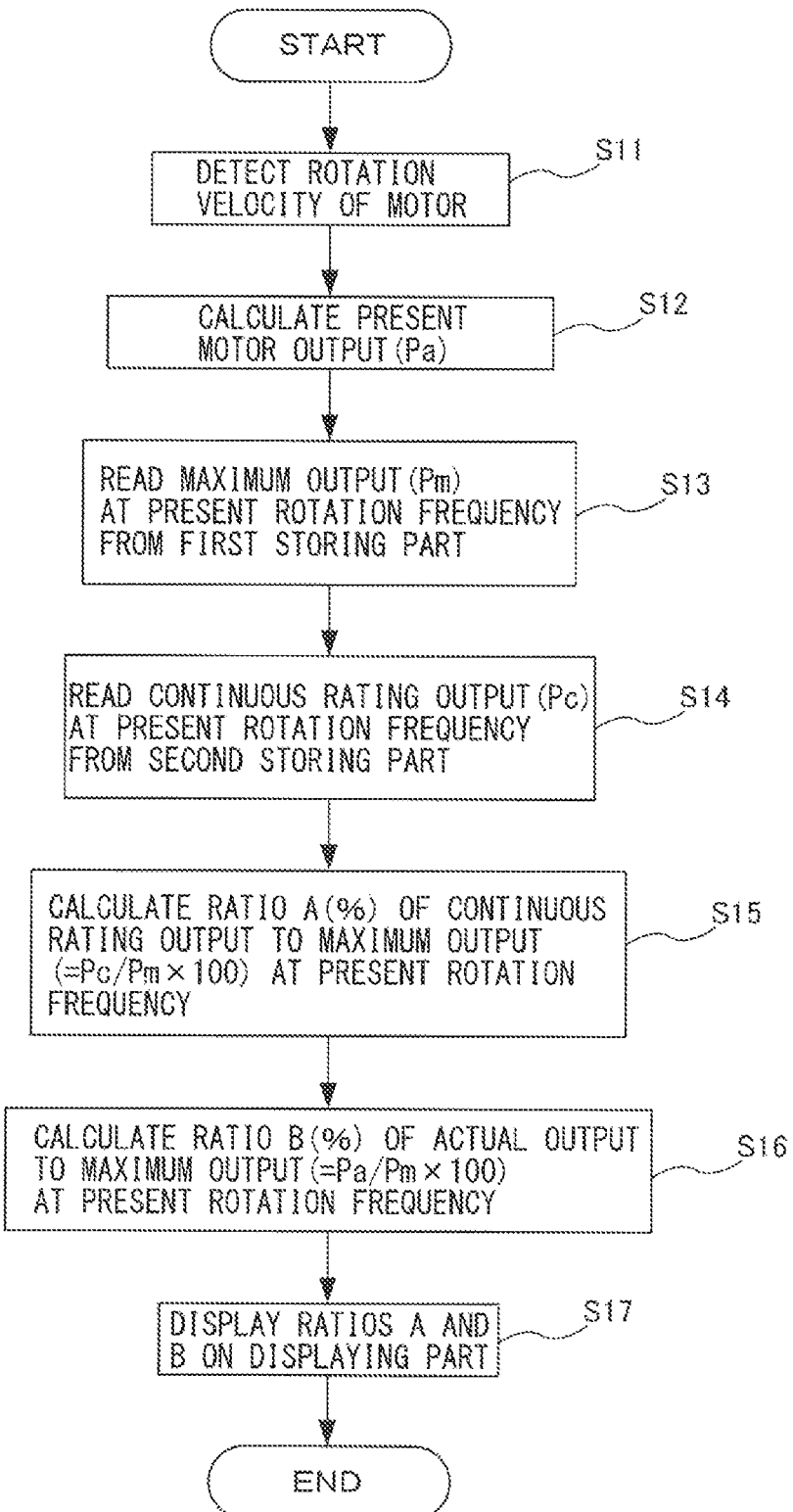
FIG. 2 is a flowchart indicating one example of the procedure of the controller of FIG. 1.

FIG. 2 is a flowchart indicating one example of the procedure of controller 18. First, the rotation velocity of motor 12 at the time of operation (for example, when workpiece 16 is cut) is detected (step S11).

Next, in step S12, an output of motor 12 at the present time (Pa) is calculated. The present output value (or an actual output value) may be calculated by multiplying an actual present value of motor 12 by a voltage command value. Otherwise, when motor 12 is a synchronous motor, the actual output value may be determined by multiplying the velocity of motor 12 by a torque command value and a torque constant. On the other hand, when motor 12 is an induction motor, the actual output value may be determined by multiplying an excitation current command value by a torque current value and a motor velocity value.

Next, the maximum output (Pm) of motor 12 at the present rotation velocity obtained in step S11 is read from first storing part 24 (step S13). Similarly, the continuous rating output (Pc) of motor 12 at the present rotation velocity obtained in step S11 is read from second storing part 26 (step S14).

Next, in step S15, a first ratio (A), which corresponds to a ratio of the continuous rating output to the maximum output at the present rotation frequency of the motor, is calculated. Concretely, the first ratio (%) can be calculated by using following equation (1).

$$A = Pc/Pm \times 100 \qquad (1)$$

Next, in step S16, a second ratio (B), which corresponds to a ratio of the present actual output to the maximum output at the present rotation frequency of the motor, is calculated. Concretely, the second ratio (%) can be calculated by using following equation (2).

$$B = Pa/Pm \times 100 \qquad (2)$$

Next, in step S17, the first and second ratios (A, B) obtained in steps S15 and S16 are displayed on displaying part 32 (preferably, aligned on the same screen). Hereinafter, the displaying manner of the ratios is explained.

Figure 3:
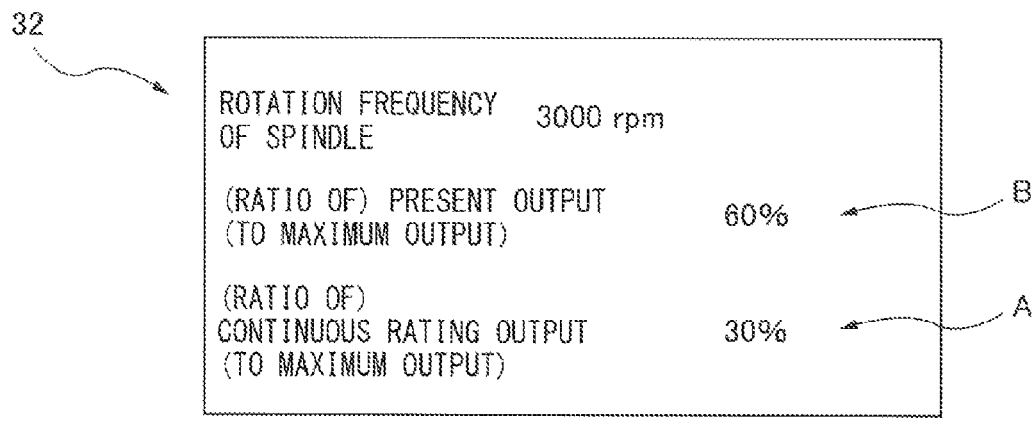
FIG. 3 is a diagram showing an example wherein first and second ratios obtained by the procedure of FIG. 2 are displayed as mathematical values on the same screen.

FIG. 3 shows an example wherein first ratio A and second ratio B are displayed as mathematical values on the same screen. The example of FIG. 3 represents that first ratio A is 30% and second ratio B is 60%, when workpiece 16 is processed under the condition that a rotation frequency of the spindle is 3000 rpm. In this regard, when second ratio B is 100%, the actual output of the motor is equal to the maximum output. Therefore, second ratio B corresponds to a margin of the actual output relative to the maximum output. On the other hand, since first ratio A represents a ratio of the continuous rating output to the maximum output, a difference between A and B corresponds to a margin of the actual output to the continuous rating output.

In the example of FIG. 3, second ratio B is larger than first ratio A, and thus the present output exceeds the continuous rating output. Therefore, at the present time, there is no problem with the brief period of processing, but the processing cannot be continuously carried out for a long time. As such, by displaying the first and second ratios on the same screen, the operator can recognize both the margins of the present output relative to the maximum output and the continuous rating output.

Figure 4:
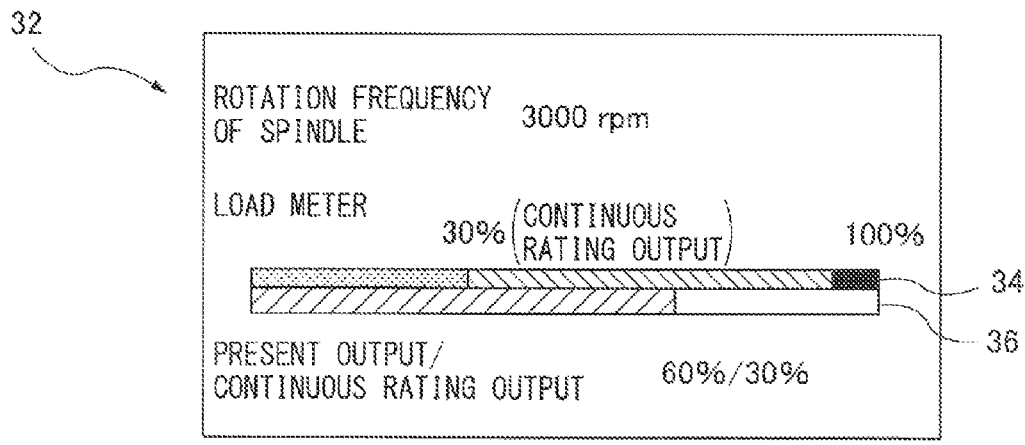
FIG. 4 is a diagram showing an example wherein first and second ratios obtained by the procedure of FIG. 2 are displayed as bar graphs on the same screen.

FIG. 4 shows an example wherein first ratio A and second ratio B of FIG. 3 are displayed as graph bars on the same screen. When a bar graph 34 representing first ratio A and a bar graph 36 representing second ratio B are aligned and displayed, with the respective maximum values being 100% (i.e., with the same scale), the margin of the actual output relative to the maximum output (i.e., the difference between second ratio B and 100%) and the margin of the actual output relative to the continuous rating output (i.e., the difference between second ratio B and first ratio A) can be easily visually recognized. In addition, as shown in FIG. 4, the values of first ratio A and second ratio B may also be indicated as mathematical values.

Further, as shown in FIG. 4, each of the two bar graphs may be color-coded corresponding to the values of first and second ratios, as well as may be aligned and displayed. For example, in bar graph 34 regarding the first ratio, a range from 0% to 30% (or first ratio A) may be colored in blue, a range from 30% to 90% may be colored in yellow, and a range from 90% to 100% may be colored in red, whereby the visibility of the bar graph can be further improved. In this regard, "90%" is determined as a threshold for informing the operator that the margin up to the maximum output (100%) is small, and the other value (for example, 80% or 85%) may be determined as the threshold. Otherwise, although not shown, only bar graph 36 regarding the second ratio may be displayed, wherein a marker such as an arrow may be displayed at a position of bar graph 36 corresponding to the first ratio of graph 34 (in this case, 30%).

Figure 5:
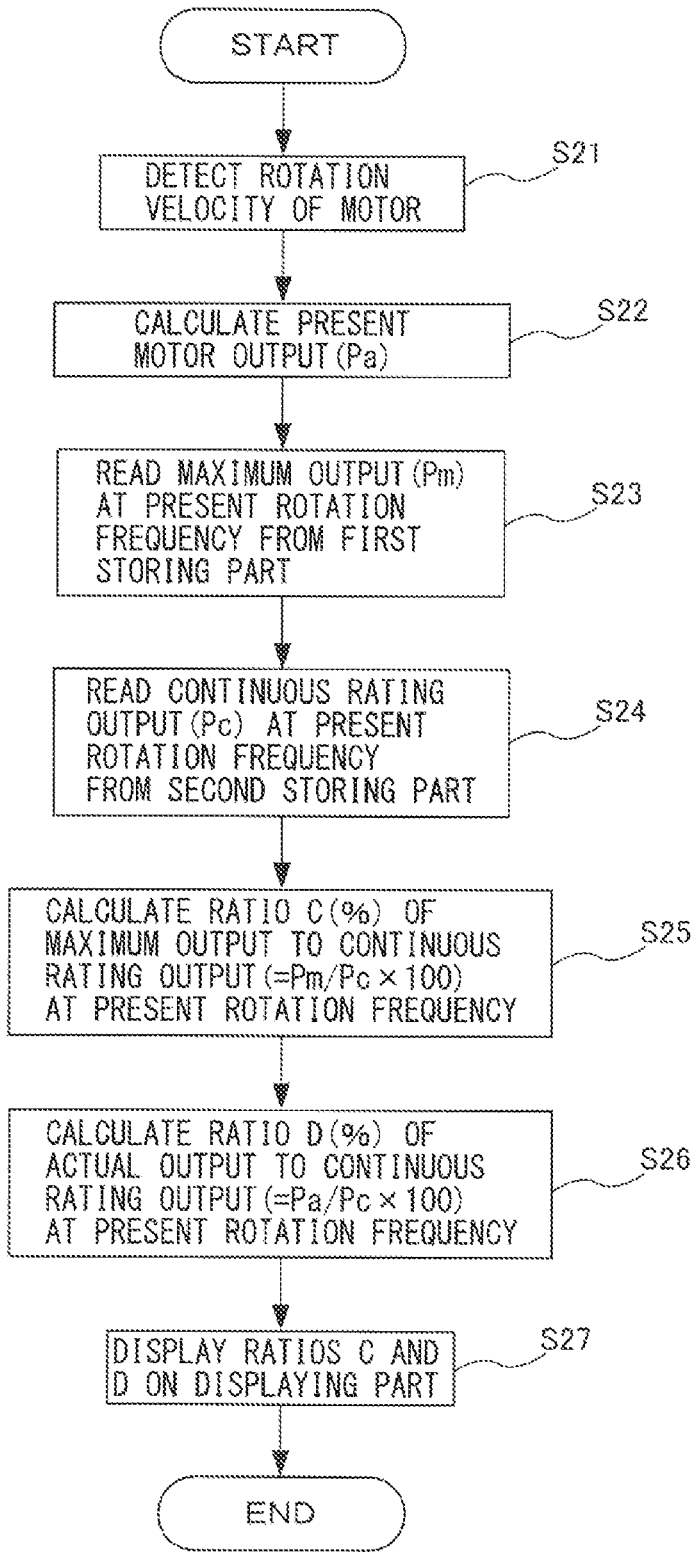
FIG. 5 is a flowchart indicating another example of the procedure of the controller of FIG. 1.

FIG. 5 is a flowchart indicating another example of the procedure of controller 18. First, the rotation velocity of motor 12 at the time of operation (for example, when workpiece 16 is cut) is detected (step S21).

Next, in step S22, an output of motor 12 at the present time (Pa) is calculated. The present output value (or an actual output value) may be calculated by multiplying an actual present value of motor 12 by a voltage command value. Otherwise, when motor 12 is a synchronous motor, the actual output value may be determined by multiplying the velocity of motor 12 by a torque command value and a torque constant. On the other hand, when motor 12 is an induction motor, the actual output value may be determined by multiplying an excitation current command value by a torque current value and a motor velocity value.

Next, the maximum output (Pm) of motor 12 at the present rotation velocity obtained in step S21 is read from first storing part 24 (step S23). Similarly, the continuous rating output (Pc) of motor 12 at the present rotation velocity obtained in step S21 is read from second storing part 26 (step S24).

Next, in step S25, a first ratio (C), which corresponds to a ratio of the maximum output to the continuous rating output at the present rotation frequency of the motor, is calculated. Concretely, the first ratio (%) can be calculated by using following equation (3).

$$C = Pm/Pc \times 100 \qquad (3)$$

Next, in step S26, a second ratio (D), which corresponds to a ratio of the present actual output to the continuous rating output at the present rotation frequency of the motor, is calculated. Concretely, the second ratio (%) can be calculated by using following equation (4).

$$D = Pa/Pc \times 100 \qquad (4)$$

Next, in step S27, the first and second ratios (C, D) obtained in steps S25 and S26 are displayed on displaying part 32 (preferably, aligned on the same screen). In other words, the flowchart of FIG. 5 is different from the flowchart of FIG. 2 in that first ratio C obtained in step S25 is a reciprocal of first ratio A obtained in step S15 in the flowchart of FIG. 2, and that second ratio D obtained in step S26 is the ratio of the actual output to the continuous rating output (=B/A), not the ratio of the actual output to the maximum output (i.e., second ratio B) obtained in step S16 in the flowchart of FIG. 2. The other steps of FIG. 5 may be the same as the steps of FIG. 2. Hereinafter, the displaying manner of the ratios is explained.

Figure 6:
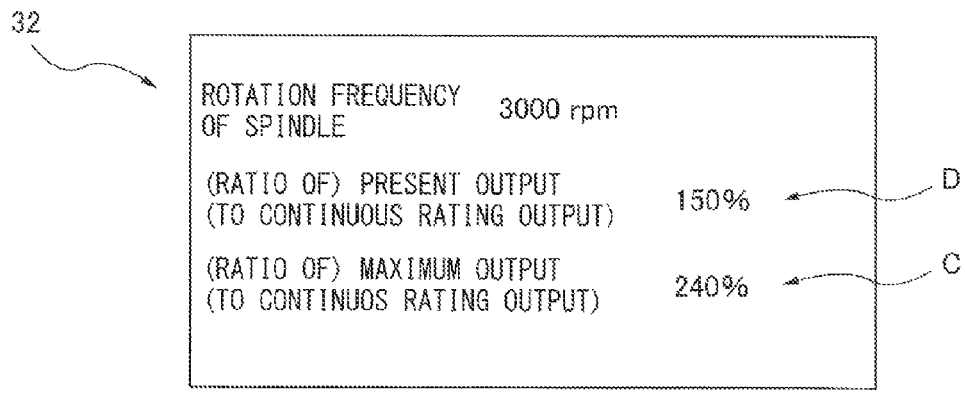
FIG. 6 is a diagram showing an example wherein first and second ratios obtained by the procedure of FIG. 5 are displayed as mathematical values on the same screen.

FIG. 6 shows an example wherein first ratio C and second ratio D are displayed as mathematical values on the same screen. The example of FIG. 6 represents that first ratio C is 240% and second ratio D is 150%, when workpiece 16 is processed under the condition that a rotation frequency of the spindle is 6000 rpm. In this regard, when second ratio D is 100%, the actual output of the motor is equal to the continuous rating output. Therefore, when second ratio D is not more than 100%, the present output is not more than the continuous rating output (i.e., the processing can be continuously carried out). On the other hand, since first ratio C represents a ratio of the maximum output to the continuous rating output, a difference between C and D corresponds to a margin of the actual output to the maximum output.

In the example of FIG. 6, second ratio D exceeds 100% and is smaller than first ratio C, and thus the present output does not exceed the maximum output. Therefore, at the present time, there is no problem with the brief period of processing, but the processing cannot be continuously carried out for a long time. As such, by displaying the first and second ratios on the same screen, the operator can recognize both the margins of the present output relative to the continuous rating output and the maximum output.

Figure 7:
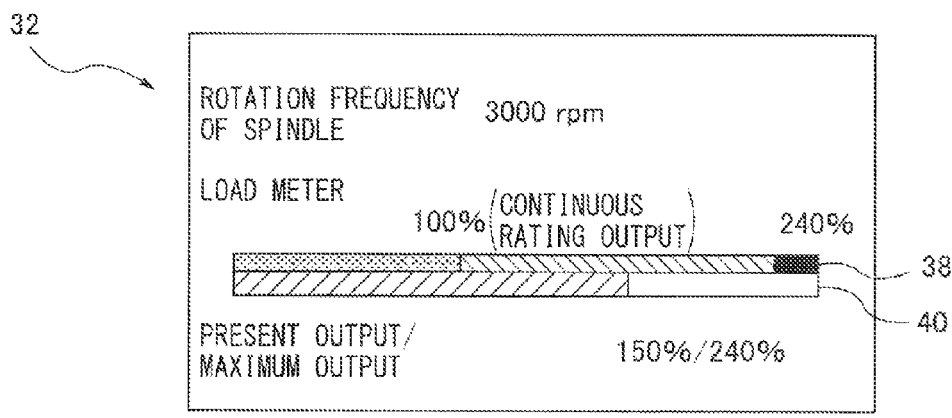
FIG. 7 is a diagram showing an example wherein first and second ratios obtained by the procedure of FIG. 5 are displayed as bar graphs on the same screen.

FIG. 7 shows an example wherein first ratio C and second ratio D of FIG. 6 are displayed as graph bars on the same screen. When a bar graph 38 representing first ratio C and a bar graph 40 representing second ratio D are aligned and displayed, with the respective maximum values being 240% (=first ratio C) (i.e., with the same scale), the margin of the actual output relative to the continuous rating output (i.e., the difference between second ratio D and 100%) and the margin of the actual output relative to the maximum output (i.e., the difference between second ratio D and first ratio C) can be easily visually recognized. In addition, as shown in FIG. 7, the values of first ratio C and second ratio D may also be indicated as mathematical values.

Further, as shown in FIG. 7, each of the two bar graphs may be color-coded corresponding to the values of first and second ratios, as well as may be aligned and displayed. For example, in bar graph 38 regarding the first ratio, a range from 0% to 100% (i.e., a range not more than the continuous rating output) may be colored in blue, a range from 100% to 216% may be colored in yellow, and a range from 216% to 240% may be colored in red, whereby the visibility of the bar graph can be further improved. In this regard, "216%" is determined as a threshold for informing the operator that the margin up to the maximum output (240%) is small, and the other value (for example, 192% or 204%) may be determined as the threshold.

According to the present invention, by displaying the first and second ratios on the same screen (or display), the status of the load applied to the spindle of the machine tool can be easily monitored by the operator. Concretely, the operator can be informed of can recognize both the margins of the present output relative to the maximum output and the continuous rating output. Further, information regarding the status and the margins can be simply displayed as the mathematical values and/or the bar graphs.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A controller for controlling a motor which drives a spindle of a machine tool, the controller comprising:
a first storing part which stores first data representing a relationship between a rotation frequency of the motor and a maximum output of the motor;
a second storing part which stores second data representing a relationship between the rotation frequency of the motor and a continuous rating output of the motor;
a first ratio calculating part which calculates a first ratio corresponding to a ratio of one of the maximum output and the continuous rating output to the other at a present rotation frequency of the motor;
a second ratio calculating part which calculates a second ratio corresponding to a ratio of a present actual output of the motor to the one of the maximum output and the continuous rating output at the present rotation frequency of the motor; and
a displaying part which displays the first ratio and the second ratio on the same screen,
wherein the controller is coupled to the motor and configured to control the motor based on the present rotation frequency of the motor and the present actual output of the motor operation at a time of operation when the spindle is driven by the motor to carry out a processing on a workpiece, and
wherein the displaying part displays the first ratio and the second ratio on the same screen to enable control of the motor based on the displayed first and second ratios.

2. The controller as set forth in claim 1, wherein the displaying part displays the first ratio and the second ratio as mathematical values on the same screen.

3. The controller as set forth in claim 1, wherein the displaying part displays the first ratio and the second ratio as bar graphs on the same screen.

4. The controller as set forth in claim 1, further comprising:
a velocity detecting part coupled to the motor and configured to detect the present rotation frequency of the motor.

* * * * *